(12) United States Patent
Kuchi et al.

(10) Patent No.: US 11,683,081 B2
(45) Date of Patent: Jun. 20, 2023

(54) METHOD FOR ALLOCATING RESOURCES TO A PLURALITY OF USERS BY A BASE STATION

(71) Applicants: INDIAN INSTITUTE OF TECHNOLOGY HYDERABAD, Sangareddy (IN); WISIG NETWORKS PRIVATE LIMITED, Hyderabad (IN)

(72) Inventors: Kiran Kumar Kuchi, Hyderabad (IN); Saidhiraj Amuru, Hyderabad (IN); Harish Kumar Dureppagari, Hyderabad (IN); Pavan Kumar Reddy Manne, Hyderabad (IN)

(73) Assignees: INDIAN INSTITUTE OF TECHNOLOGY HYDERABAD; WISIG NETWORKS PRIVATE LIMITED

( * ) Notice: Subject to any disclaimer, the term of this patent is extended or adjusted under 35 U.S.C. 154(b) by 0 days.

(21) Appl. No.: 17/172,404

(22) Filed: Feb. 10, 2021

(65) Prior Publication Data

US 2021/0266049 A1 Aug. 26, 2021

(30) Foreign Application Priority Data

Feb. 20, 2020 (IN) .............................. 202041005719

(51) Int. Cl.
*H03H 7/40* (2006.01)
*H04B 7/06* (2006.01)
(Continued)

(52) U.S. Cl.
CPC ........... *H04B 7/063* (2013.01); *H04B 7/0452* (2013.01); *H04B 7/0626* (2013.01); *H04B 7/0632* (2013.01); *H04W 28/0278* (2013.01)

(58) Field of Classification Search
CPC .. H04B 7/0452; H04B 7/0626; H04B 7/0632; H04B 7/0617; H04B 7/0689;
(Continued)

(56) References Cited

U.S. PATENT DOCUMENTS 10,659,115 B1 * 5/2020 Marupaduga ........ H04B 7/0452
2007/0223422 A1 * 9/2007 Kim ..................... H04B 7/0632
370/334

(Continued)

*Primary Examiner* — Khai Tran
(74) *Attorney, Agent, or Firm* — McAndrews, Held & Malloy, Ltd.

(57) ABSTRACT

Embodiments of the present disclosure relates to a method for allocating resources to a plurality of users by a base station in a communication network. The method comprises obtaining a plurality of parameters associated with each of the plurality of users. The plurality of parameters is at least one of a buffer occupancy, a channel quality, and a channel state information acquisition capability. Also, the method comprises segregating the users into a plurality of groups using at least one of the plurality of parameters, wherein each group comprises one or more users. Further, the method comprises obtaining a group specific metric for each of the plurality of groups using at least one of the plurality of parameters, and allocating resources to the one or more users of the plurality of groups using the group specific metric.

20 Claims, 11 Drawing Sheets

(51) Int. Cl.
*H04W 28/02* (2009.01)
*H04B 7/0452* (2017.01)

(58) Field of Classification Search
CPC ............ H04W 72/121; H04W 28/0278; H04L 5/0037; H04L 5/0057
USPC ................................ 375/329, 260, 262, 267
See application file for complete search history.

(56) References Cited

U.S. PATENT DOCUMENTS

| | | | |
|---|---|---|---|
| 2010/0166097 A1* | 7/2010 | Zhou | H04B 7/0452 375/267 |
| 2010/0266057 A1* | 10/2010 | Shrivastava | H04W 72/121 375/260 |
| 2012/0257664 A1* | 10/2012 | Yue | H04B 7/0452 375/267 |
| 2013/0128832 A1* | 5/2013 | Kang | H04L 5/0048 370/329 |
| 2014/0254517 A1* | 9/2014 | Nam | H04L 5/0057 370/329 |
| 2017/0105229 A1* | 4/2017 | Luo | H04W 72/0446 |
| 2022/0085929 A1* | 3/2022 | Ren | H04L 27/2613 |

* cited by examiner

METHOD FOR ALLOCATING RESOURCES TO A PLURALITY OF USERS BY A BASE STATION

PRIORITY CLAIM

The present application claim priority, under 35 U.S.C. § 119(b) and 37 CFR 1.55, to Indian Patent Application Serial No. IN 202041005719, filed on Feb. 20, 2020, and entitled "L2 SCHEDULER AND A METHOD OF RESOURCE ALLOCATION." The aforementioned application is hereby incorporated herein by reference in its entirety.

TECHNICAL FIELD

Embodiments of the present disclosure are related, in general to communication, but exclusively relate to allocating resources to a plurality of users in a communication network.

BACKGROUND

Limitations and disadvantages of conventional approaches to allocating resources will become apparent to one of skill in the art, through comparison of such approaches with some aspects of the present method and system set forth in the remainder of this disclosure with reference to the drawings.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In an aspect of the present disclosure a method for allocating resources to a plurality of users by a base station (BS) in a communication network is provided. The method comprises obtaining, by the BS, a plurality of parameters associated with each of the plurality of users. The plurality of parameters is at least one of a buffer occupancy, a channel quality, and a channel state information (CSI) acquisition capability. Also, the method comprises segregating the plurality of users into a plurality of groups using at least one of the plurality of parameters, wherein each of the plurality of groups comprises one or more users. Further, the method comprises obtaining a group specific metric for each of the plurality of groups using at least one of the plurality of parameters associated with the one or more users associated with each of the plurality of groups. Thereafter, the method comprises allocating resources to the one or more users of the plurality of groups using the group specific metric.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1:
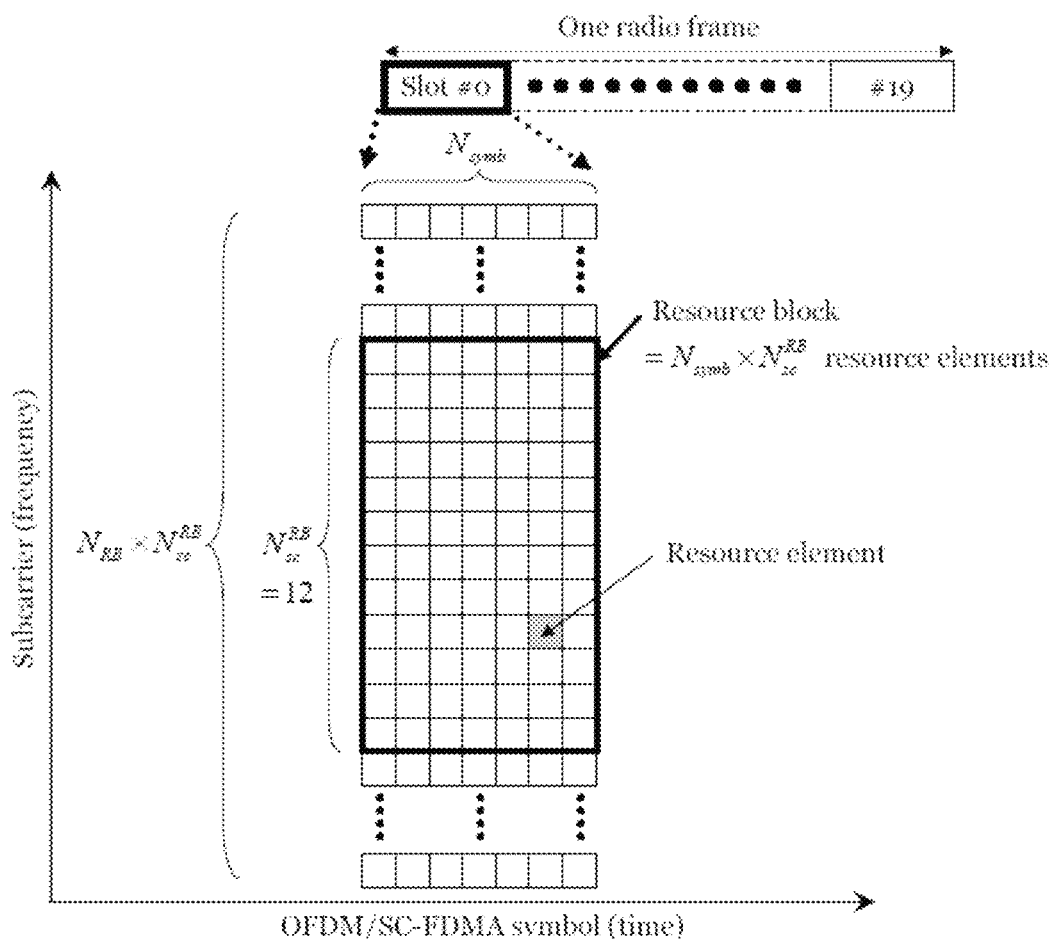
FIG. 1 shows an illustration of a resource grid in a communication system.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Currently, communication systems have large number of antennas supporting a variety of transmission modes that can be used to satisfy the huge data requirements of the user equipment's (UEs) or mobile devices. To achieve this, there is need of multi-user multiple-input and multiple-output (MU-MIMO) technology to be used efficiently. The modern-day cellular systems deal with various types of UEs requesting different types of data. For this, a scheduler is required to handle all the UEs and to satisfy all the various requirements.

Also, cellular system deals with different kinds of users requesting different types of data with different priority associated with each type of data. So there is a need of potential scheduler which can handle different priorities, data requirements and yet maintaining fairness among the active users. With larger antenna arrays and 3gpp supporting different transmission modes in LTE, there is need to exploit gains of MU-MIMO to meet spectral efficiency requirements.

Generally, most of the LTE users operate in TM3/4 single-user multiple-input and multiple-output (SU-MIMO) and most of the users in market are of Rel 8 supported. Rel 8 supports TM7 transmission mode in which users can be multiplexed in multi-user multiple-input and multiple-output (MU-MIMO). Scheduler will be relatively of lesser complexity if it needs to handle only SU-MIMO users or MU-MIMO users. Introducing multiplexing of SU-MIMO users and MU-MIMO users over frequency will need more sophisticated scheduling algorithms and scheduler becomes significantly complex. Thus, a base station (BS) uses a scheduler prioritizes all the UEs as per their requirements and thereafter schedules them. The scheduler of the BS makes sure that all the UE requirements are met, and no UE is starved. In general, the UEs often operate in transmission mode (TM) 3, or TM4 to serve UE via SU-MIMO. With the advance in technology, there are more UEs which requires support of other TMs, such as TM7 and TM8. Also, there is a demand for large number of antennas requiring TM9 supported UEs, for more flexibility in MU-MIMO UE pairing.

FIG. 1 shows an illustration of a resource grid in a communication system. This resource grid is for long term evolution (LTE) to schedule resources in both time and frequency. As shown in FIG. 1, considering one radio frame is of 10 ms consisting of 10 subframes each of 1 ms. Each subframe is of 2 slots and each slot is of 0.5 ms. There would be 7 OFDM/SCFDM symbols in a slot. So, there would be 14 symbols in a subframe and totally 140 symbols in a frame. One Physical Resource Block (PRB) is of 0.5 ms in time and 12 subcarriers in each symbol. Smallest unit in a resource grid is called as resource element. A PRB comprises of 84 resource elements. Resource allocation for the scheduled users or UEs is performed based on the corresponding proportional fair metric in terms of PRBs. Number of PRBs to be allocated to a user is proportional to its PF metric. With the advance in technology, there are more UEs which requires support of other TMs and resources. There is a need to improve the resource allocation by the base station to the UEs.

Embodiments of the present disclosure relates to a method of resource allocation for a plurality of users performed by a scheduler at a base station (BS). The scheduler of the BS performs segregation of SU-MIMO and MU-MIMO eligible users based on associated buffer occupancy and CSI feedback. The scheduler uses TM7 or an equivalent transmission method to schedule users in MU-MIMO fashion. The scheduler prioritizes users for scheduling based on their PF metric. The PF metric comprises of QCI Priority, throughput priority, and PDB priority. The scheduler orders users based on PF metric and schedule both SU and MU-MIMO users in same TTI considering the PDCCH capacity constraints. Further, the scheduler used PF based ordered list and downlink CSI as inputs and selects users to be multiplexed for MU-MIMO. After deciding users to be scheduled in a TTI, scheduler does resource allocation based on users' PF metric and buffer occupancy. The scheduler addresses the several challenges when SU and MU-MIMO users are multiplexed in a same TTI across frequency.

The challenges include segregation of SU and MU-MIMO eligible users, selecting both SU and MU-MIMO users that may be scheduled in a TTI and allocating resources among those users across frequency i.e., multiplexing SU and MU-MIMO users within maximum available bandwidth. Transmission modes (TM) 3/4 or similar transmission methods exist which can support only SU-MIMO and codebook based precoding. TM7 is single port, port 5 transmission using one port DMRS and supports non codebook based precoding. The scheduler uses TM7 or equivalent transmission method to schedule users in MU-MIMO. Also, the scheduler is configured to segregate users into SU-MIMO and MU-MIMO eligible users based on associated buffer occupancy and CSI feedback.

The resource allocation performed by the BS uses a method for prioritizing users for scheduling based on associated PF metric. Further, the scheduler orders users based on PF metric and schedule both SU and MU-MIMO users in same TTI considering the control channel capacity constraints. The user pairing performs pairing of the users by considering the PF metric based ordered list and acquired CSI as inputs and selects users to be multiplexed for MU-MIMO. After deciding users to be scheduled in a TTI, scheduler does resource allocation based on users' PF metric and buffer occupancy. This method achieves higher spectral efficiency and maintaining fairness among users.

Figure 2:
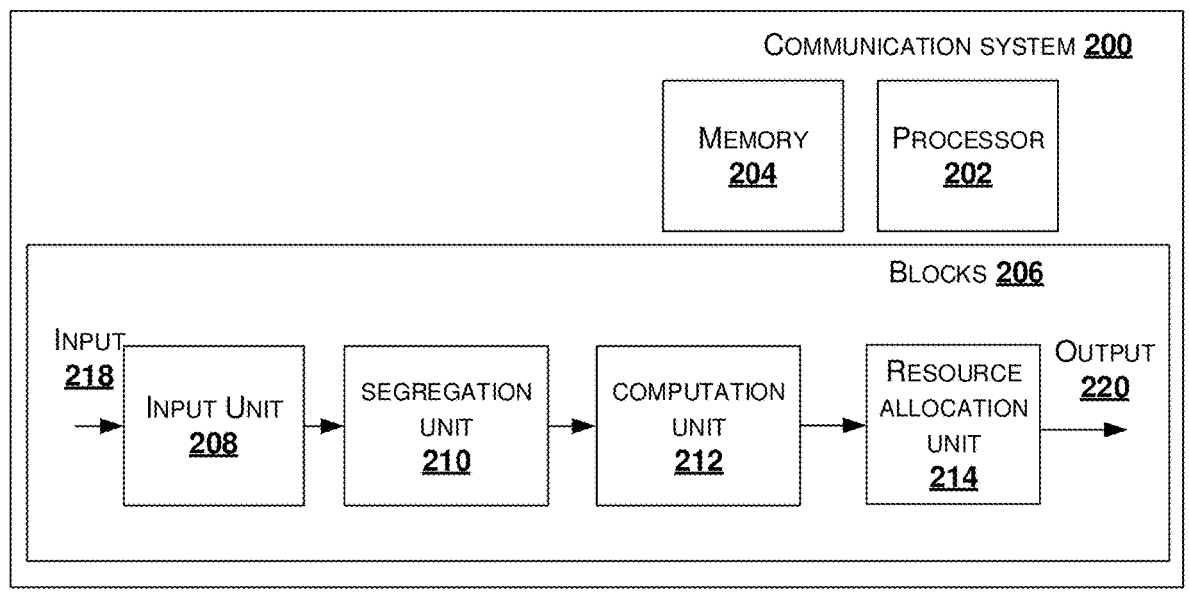
FIG. 2 shows a block diagram of a communication system for allocating resources to a plurality of users in a communication network, in accordance with some embodiments of the present disclosure.

FIG. 2 shows a block diagram of a communication system for allocating resources to a plurality of users in a communication network, in accordance with some embodiments of the present disclosure.

As shown in FIG. 2, the communication system 200, also referred as a base station (BS) or a base station system, comprises a processor 202, a memory 204. Also, the BS 200 comprises a plurality of antennas (not shown in the Figure), for transmitting and receiving data or information. The memory 204 may be communicatively coupled to the processor 202. The processor 202 may be configured to perform one or more functions of the BS 200 such as, but not limited to transmitting and receiving signals, and allocating resources to a plurality of users. The plurality of users is plurality of user equipment's (UEs), and to simplify, are referred as users or UEs. In one implementation, the BS 200 may comprise blocks 206, also referred as units or modules, for performing various operations in accordance with the embodiments of the present disclosure.

The blocks 206 include an input unit 208, a segregation unit 210, a computation unit 212, a resource allocation unit 214, a plurality of antennas and other blocks (not shown in the Figure). The segregation unit 210, the computation unit 212, and the resource allocation unit 214 are together referred as a scheduler.

The input unit 208, configured in the BS 200, receives a plurality of inputs 218, or referred as inputs. The input 218 is received from a plurality of user equipment's comprises a plurality of parameters, also referred as parameters. The plurality of parameters is at least one of buffer occupancy, channel quality or channel quality indicator (CQI), channel state information (CSI) acquisition capability and the like. In an embodiment, the parameters may also include at least one of sounding reference signals (SRS), buffer occupancy, type of traffic, and the like.

The segregation unit 210 is configured in the BS 200 to perform segregating of the plurality of users into a plurality of groups using at least one of the plurality of parameters. Each of the plurality of groups comprises one or more users. The segregation unit 210 may also be referred as grouping unit or classifier or classification unit.

The segregation unit 210 classifies the UEs using CQI metric obtained for each UE from the inputs 218. The UE classification is based on certain characteristic such as, but not limited to voice over long term evolution (VoLTE), voice over NR (voNR) and High Speed UEs, low channel quality indicator (CQI), low buffer user, single user multiple input multiple output (SU-MIMO) eligible user, multi user multiple input multiple output (MU-MIMO) eligible user, high buffer user, high CQI user, cell edge user, voice over long term evolution (LTE) user, voice over NR (new radio) and the like. The classification or grouping of UEs produces a plurality of groups such as, but not limited to VoLTE, voNR and High Speed UEs group, low CQI or low buffer UE group, high buffer or high CQI group and cell edge UE group is as shown in FIG. 3.

Figure 3:
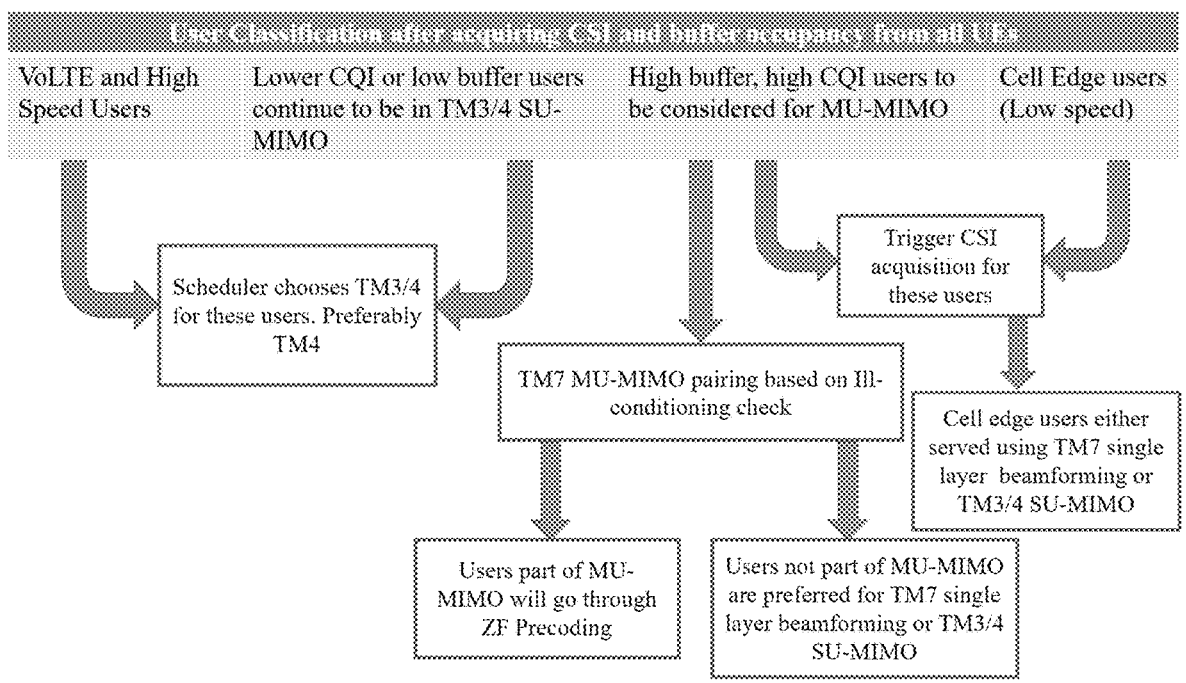
FIG. 3 shows an illustration of classification of a plurality of users by the communication system, in accordance with an embodiment of the present disclosure.

FIG. 3 shows an illustration of classification of a plurality of UEs by the communication system, in accordance with an embodiment of the present disclosure. The plurality of users is also referred as users or UE's. The classification of the plurality of UEs also referred as classification of UE's. The classification of the users into a plurality of groups is performed by the segregation unit 210 of the BS 200 using at least one of the plurality of parameters, wherein each of the plurality of groups comprises one or more users. The classification is performed using the plurality of parameters such as but not limited to, Channel State Information (CSI) acquisition triggering and multi-user multiple-input and multiple-output (MU-MIMO), in accordance with an embodiment of the present disclosure. The segregation unit 210 of the BS 200 is configured to perform method of classifying the UEs, such that the UE capability decides mode of operation. As shown in FIG. 3, the method is applied by considering all the UEs supports one of the transmission mode (TM) such as TM 3, TM4, TM7, or other equivalent transmission methods, capable of sounding SRS or feeding back the explicit CSI.

In an embodiment, the segregation unit 210 performed the segregation of the users is performed by classifying the users as one of two sets of users, i.e. a lightly loaded users and heavily loaded users with better channel condition. In one embodiment, TM4 type CSI Feedback is used. A new UE is preferred to be part of SU-MIMO, i.e. preferably TM4 or equivalent transmission method. Upon a request from a Base station (BS), the new UE, which may be a TM4 or equivalent transmission method scheduled user, may provide channel state information (CSI) feedback to the BS. The CSI feedback includes such as, but not limited to channel quality indicator (CQI), preceding matrix indicator (PMI) and rank indicator (RI), wherein the CQI indicates the maximum modulation and coding scheme (MCS) level that user can support, the PMI indicates the preferred codebook that needs to be used while transmitting the data and the RI indicates the maximum number of layers' user can support.

In an embodiment, the BS transmits cell-specific reference signal (CRS) or similar reference signal to a UE, which facilitates the UE to formulate a CSI. Upon estimating channel based on such a reference signal, UE maximizes capacity that may be achieved. The UE uses all the available codebooks based on the PMI and the RI to calculate post-processing signal-to-interference-plus-noise ratio (SINR) and outputs the best combination which maximizes the capacity. The SINR corresponding to maximum capacity will be mapped to a CQI such that Block Error Rate (BLER) is promised to be less than 10%. This mapping is performed using BLER vs SINR curves for all CQI code rate levels.

The CQI is a maximum MCS level that a user may support and the CQI is valid for SU-MIMO users. in an embodiment, when the BS maps receives the CQI to an MCS, the BS ensure that transmitted MCS would be successfully decoded with more than 0.9 probability. So, the CQI to the MCS mapping always preferred to be conservative irrespective of one of SU-MIMO and MU-MIMO, in order to make more successful transmissions. In MU-MIMO, there is high probability to get SINR dip for each user proportional to the number of users paired for MU-MIMO. So, for MU-MIMO user, the CQI to the MCS mapping should be more conservative in order to ensure that probability of not decoding successfully does not go higher than 0.1.

In an embodiment, the UEs with higher buffer and better channel conditions over time, that is if periodically received CQI reports satisfy MU-MIMO eligibility, should be triggered to acquire downlink CSI.

Another embodiment of the present disclosure is CQI Periodicity. The scheduler of the BS 200 or the segregation unit 210 of the BS 200 assumes wideband measurement for CQI which is calculated by measuring wideband SINR over full bandwidth. A sub-band CQI which is calculated by measuring SINR in different bands across full bandwidth is generally used for frequency selective scheduling. A UE sends wideband CQI periodically for all downlink transmission modes as part of CSI feedback. The BS decides whether to request CQI or turning off CQI reports. The wideband CQI period may be configured to
{2, 5, 10, 16, 20, 32, 40, 64, 80, 128, 160} ms One embodiment of the present disclosure is obtaining or calculation of first metric, also referred as a Proportional Fair (PF) metric. The first metric or PF metric is calculated, by considering different priorities such as, but not limited to a quality of service (QoS) class identifier (QCI) priority, throughput priority and packet delay budget (PDB) priority. Table 1 below shows a priority table for various resource types, which shows standardized QCI Characteristics in LTE:

TABLE 1

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) |  | 4 | 150 ms | $10^{-3}$ | Conversational Video (Live Streaming) |
| 3 (NOTE 3) |  | 3 | 50 ms | $10^{-3}$ | Real Time Gaming |
| 4 (NOTE 3) |  | 5 | 300 ms | $10^{-5}$ | Non-Conversational Video (Buffered Streaming) |
| 5 (NOTE 3) | Non-GBR | 1 | 100 ms | $10^{-6}$ | IMS Signalling |
| 6 (NOTE 4) |  | 6 | 300 ms | $10^{-6}$ | Video (Buffered Streaming) TCP-based (e.g., www, e-mail, chat, ftp, p2p file sharing, progressive video, etc.) |
| 7 (NOTE 3) |  | 7 | 100 ms | $10^{-3}$ | Voice, Video (Live Streaming) Interactive Gaming |
| 8 (NOTE 5) |  | 8 | 300 ms | $10^{-5}$ | Video (Buffered Streaming) TCP-based (e.g., www, e-mail, chat, ftp, p2p file sharing, progressive video, etc.) |
| 9 (NOTE 6) |  | 9 |  |  |  |

The users to be scheduled in a particular Transmission Time Interval (TTI) is decided by the PF metric. The PF metric is calculated using the below equation:

PF metric=QCI Priority×Throughput Priority×PDB Priority

The QCI Priority is calculated based on the QoS type, as specified in Table 1. The QCI Priority is inversely proportional to priority value given in the Table-1, that is, lowest priority value indicates highest priority level.

In an embodiment a Packet Delay Budget (PDB) priority of a packet is used to deliver the packet before PDB expires. The PDB Priority is defined based on the time a packet stays in network relative to its PDB. If a packet of a user stays more time in network, that user should be given more priority in scheduling. Another parameter is throughput priority, which is obtained using the below equation:

$$\text{Throughput Priority} = \frac{R_k[m]}{T_k[m]}$$

where k is the UE index and m is TTI.
If k is the UE scheduled in TTI m $$T_k[m] = \left(1 - \frac{1}{t_c}\right)T_k[m-1] + \frac{1}{t_c}R_k[m]$$

If k is the unscheduled UE in TTI m $$T_k[m] = \left(1 - \frac{1}{t_c}\right)T_k[m-1]$$

Where,
$R_k[m]$ is the instantaneous rate of $k^{th}$ UE at $m^{th}$ TTI
$T_k[m-1]$ is the average rate of $k^{th}$ UE at $(m-1)^{th}$ TTI
$T_k[m]$ is the average rate of $k^{th}$ UE at $m^{th}$ TTI
$t_c$ is the averaging window period.

In proportional fair scheduling (PFS), a user is scheduled when its instantaneous rate is high relative its average rate over time. Average rate will depend on averaging time window $t_c$ as explained above. When averaging time window $t_c$ is small, PF metric gives more weightage to instantaneous rate, i.e., average rate approaches instantaneous rate in quick time when a user gets enough scheduling opportunities which leads PF metric of all users to be converging to a value in quick time. When a user does not get enough scheduling opportunities and with smaller $t_c$, average rate goes down aggressively and there would be significant gap between instantaneous rate and average rate which leads to increment in PF metric in quick time.

When averaging time window $t_c$ is large, PF metric gives less weightage to instantaneous rate, i.e., average rate slowly approaches instantaneous rate over time when a user gets enough scheduling opportunities and PF metric of all users converge slowly over time. When a user does not get enough scheduling opportunities and with larger $t_c$, average rate goes down very slowly so PF metric increases slowly over time.

In both cases, there may be a variation i.e. abrupt rise or fall in the PF metric, if instantaneous rate changes. The sudden change in observed for instantaneous rate in two scenarios. One is after receiving new CQI feedback from user and another one is after updating MCS using Outer Loop Rate Control (OLRC) based on HARQ Ack/Nacks.

The PF metric is used for ordering groups that are obtained from segregation and also ordering users within a group, as part of scheduling and resource allocation. For ordering users and groups, we also propose to use round robin scheduling. That is ordering groups or users based on the number of scheduled opportunities. PF metric is expected to be higher in order for a user or group to be prioritized whereas number of scheduling opportunities are expected to be smaller in order for a user or group to be prioritized.

One embodiment of the present disclosure is SU/MU Multiplexing. The SU/MU Multiplexing is used to allocate resources for SU and MU-MIMO users across frequency in a TTI. Before sharing resources between SU and MU-MIMO users, a segregation of SU and MU users should occur.

Figure 4:
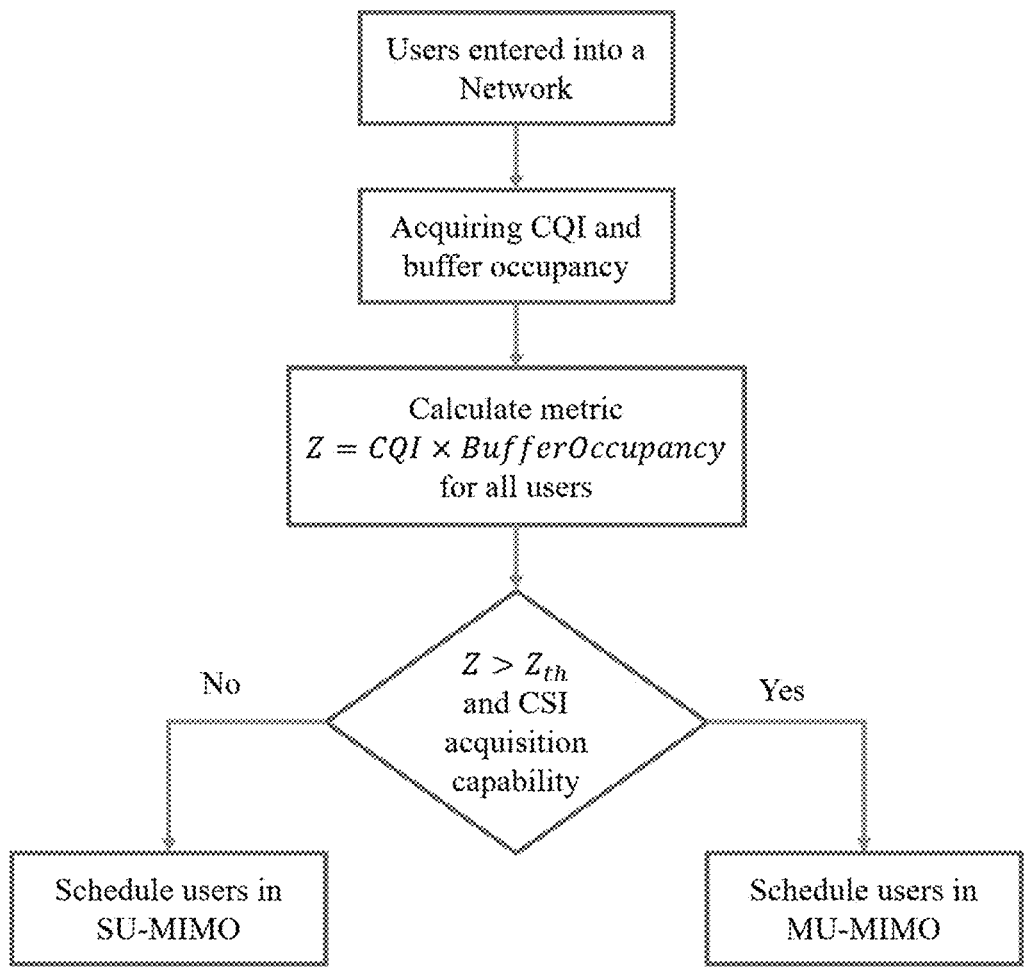
FIG. 4 shows a flowchart illustrating a method of segregation of users into single user multiple-input and multiple-output (SU-MIMO) user or multi user multiple-input and multiple-output (MU-MIMO) user based on Buffer Occupancy and CQI as part of downlink scheduling and resource allocation, in accordance with an embodiment of the present disclosure.

FIG. 4 shows a flowchart illustrating a method of segregation of SU-MIMO/MU-MIMO UEs based on Buffer Occupancy and CQI, in accordance with an embodiment of the present disclosure.

As shown in FIG. 4, a user entering into network would be served in SU-MIMO, either as TM3 or TM4 user or equivalent transmission method for other technologies. Initially all users entering the network would be assumed to be SU-MIMO users. To switch user from SU to MU-MIMO there needs to be a criterion, considering at least on of channel quality indicator (CQI) and buffer occupancy as a metric to decide SU and MU users. For CQI, base station triggers and acquire channel state information (CSI) feedback from each user, and buffer occupancy is load of each user in network. In case of uplink scheduling, received SINR at BS is averaged over a time window and averaged SINR is mapped to a CQI.

As shown in FIG. 4, a metric is obtained, which is used to decide SU and MU eligible users and metric is calculated using the below equation:

$$Z = \frac{ueBuffer}{maxBuffer} * \frac{CQI}{maxCQI}$$

If value Z of a user is more than the threshold $Z_{th}$, then that user is eligible to be part of MU-MIMO. As part of segregating users, there will be two sets of users, SU eligible and MU eligible. The users with higher buffer occupancy and higher CQI are considered to be MU-MIMO eligible users. the SU-MIMO users will be served preferably in TM4 or similar transmission method, for high speed user in TM3 or similar lower type transmission method where decoding of data is easier. The MU-MIMO users will be served in TM7 or similar multiple user transmission method. Upon scheduling a user as a MU-MIMO eligible, a downlink CSI is acquired and Transmission Mode switching is informed to the user. A transmission mode refers to a method of sending data to the UE from the base station, which includes reference signal transmission and data transmission, the subcarrier allocation for the reference signal and data among others.

In an embodiment, a downlink CSI is acquired by one of assuming the reciprocity of the uplink (UL) and downlink (DL) channels, and considering an explicit feedback of downlink channel from the user. In the first option of reciprocity method, it is assumed that channel is same in both UL and DL, and a UE transmits sounding reference signal (SRS) which base station uses to estimate the channel. This channel after RF calibration will be used for user pairing and precoding. In second option that is explicit feed, the UE estimates downlink channel and feeds back complete downlink estimates to the BS. The BS uses these estimates for user pairing and precoding. In both cases, sub band CSI followed by wideband CSI is updated over time.

In an embodiment, scheduling of SU-MIMO UEs and MU-MIMO UEs is performed. The SU-MIMO UEs and MU-MIMO UEs are also referred as SU-MIMO users and MU-MIMO users respectively. The segregation of the SU-MIMO users and MU users is performed, the users are scheduled and packed within a Transmission Time Interval (TTI). The segregated users may be referred as active users. In an embodiment, Physical Downlink Control Channel (PDCCH) Capacity decides maximum number of users that can be scheduled in a TTI. The active users need to be prioritized based on the first metric or PF metric before scheduling. After ordering the users, scheduling of the SU-MIMO users and the MU-MIMO users will be performed as shown in FIG. 5B. As part of scheduling, two sets of users are maintained, one is to save total scheduled users and another is to save MU-MIMO paired users.

Referring back to FIG. 2, after the segregation of the plurality of users into a plurality of groups, the computation unit 212 computes to obtain a group specific metric for each of the plurality of groups using at least one of the plurality of parameters associated with the one or more users associated with each of the plurality of groups. The group specific metric of each of the plurality of groups is obtained using a first metric of the one or more users associated with each of the plurality of groups. The first metric is one of a proportional fair metric and number of scheduled opportunities The resource allocation unit 214 of the BS 200 is configured to allocate resources to the one or more users of the plurality of groups using the group specific metric. The internal block diagram of the resource allocation unit is as shown in the FIG. 5A.

Figure 5A:
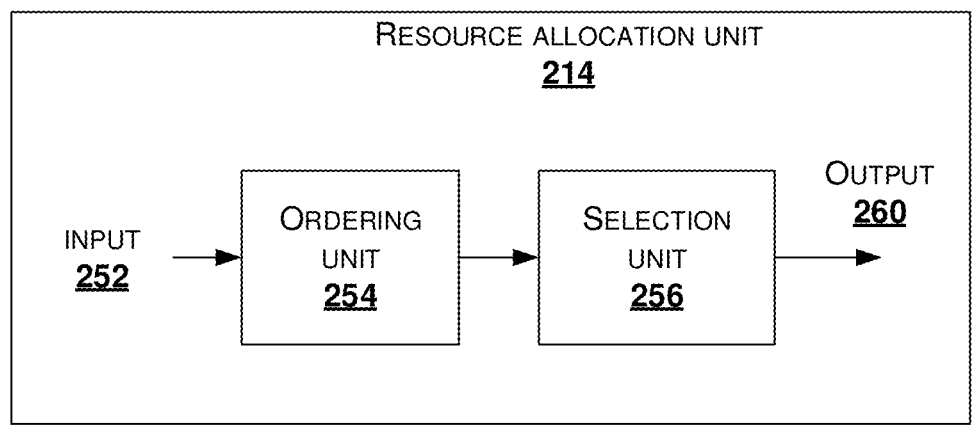
FIG. 5A shows a block diagram of a resource allocation unit of the base station, in accordance with some embodiments of the present disclosure.
Figure 5B:
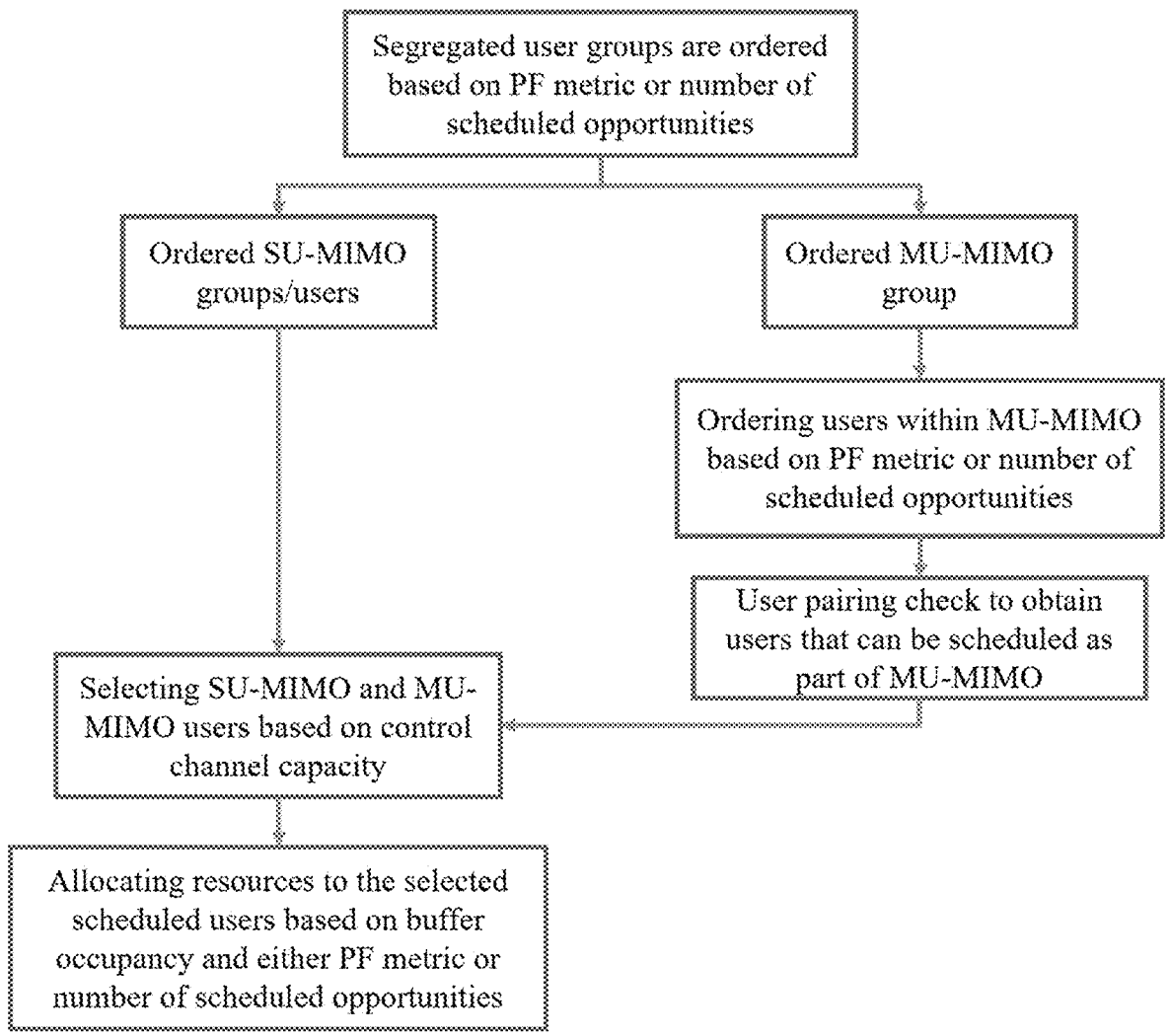
FIG. 5B shows a flow chart illustrating a method of scheduling SU-MIMO users and MU-MIMO users, in accordance with an embodiment of the present disclosure.

As shown in FIG. 5A, the resource allocation unit 214 includes an ordering unit 254, and a selection unit 256. The ordering unit 254 performed ordering on the segregated user's information received as input 252 from the segregation unit 212. For allocating resources, the ordering of the one or more users in the MU-MIMO group based on a first metric, to obtain a modified MU-MIMO group.

FIG. 5B shows a flow chart illustrating a method of scheduling SU-MIMO group users and MU-MIMO group users, in accordance with an embodiment of the present disclosure. The users are ordered or arranged based on priority associated with said users. The user's priority is obtained based on the first metric or the PF metric. The users eligible for the MU-MIMO group are arranged in descending order of PF metric, to obtain a modified MU-MIMO group. After arranging users in descending order of PF metric i.e. after obtaining modified MU-MIMO group, a pivot user with highest PF metric is picked to start user pairing. The pivot user is a user with highest first metric value within the modified MU-MIMO group. The ordering of the users is as shown in the FIG. 5B.

Figure 6:
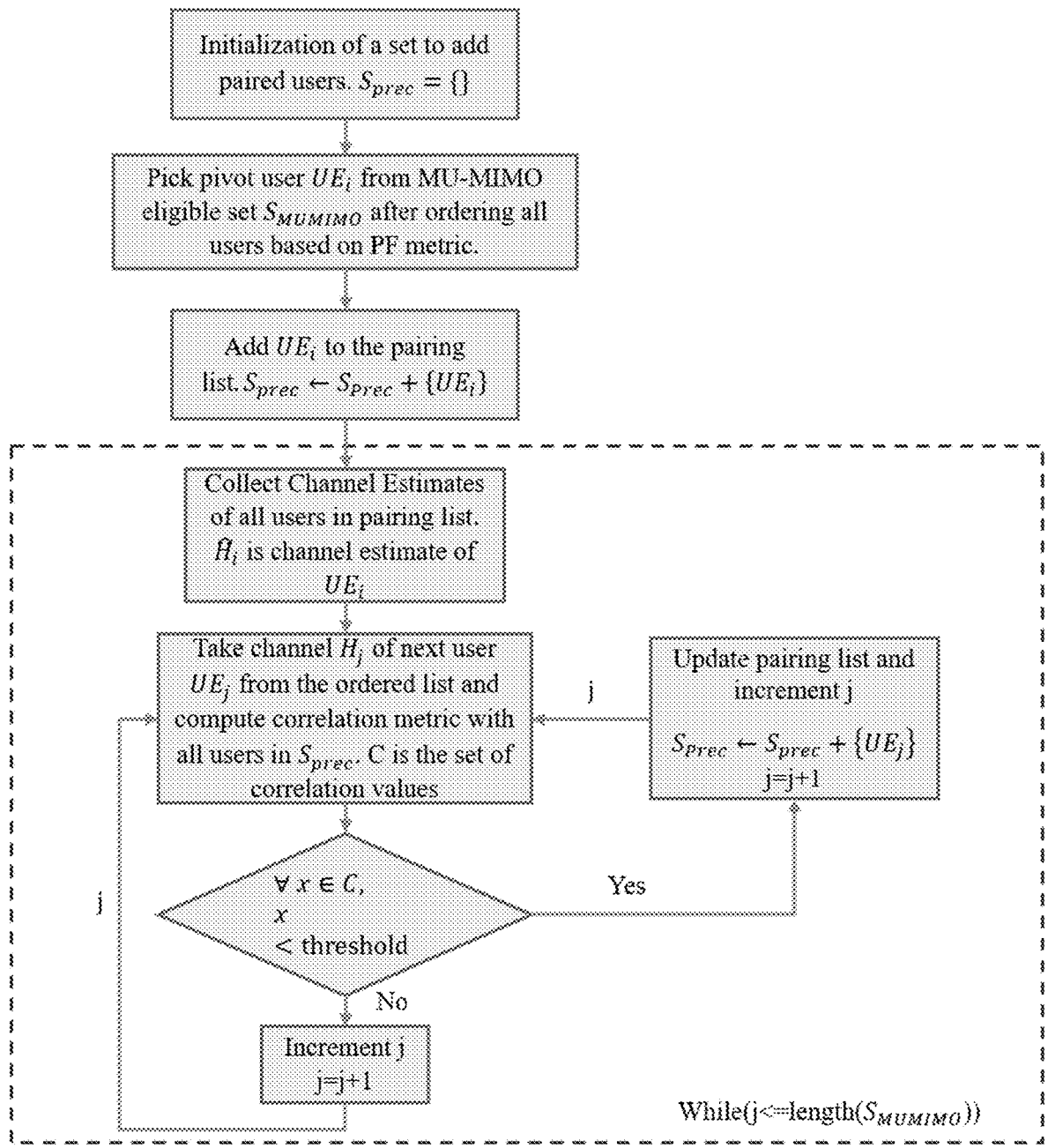
FIG. 6 shows a flow chart illustrating a method of user pairing for MU-MIMO, in accordance with an embodiment of the present disclosure.

Referring back to FIG. 5A, after obtaining the modified MU-MIMO group users the selection unit 256 performs selection of a subset of the ordered plurality of SU-MIMO groups and a sub-set of users from the re-modified MU-MIMO group based on a second metric to obtain one or more scheduled users, for allocating resources. The obtained one or more scheduled users is the output 260. The second metric is one of control channel capacity and buffer occupancy. The selection unit 256 performs user pairing to identify at least one user from the modified MU-MIMO group to obtain a remodified MU-MIMO group, said user pairing starts with the pivot user. The user pairing is illustrated in FIG. 6. The user pairing outputs a set of users which would be scheduled in same resources. FIG. 6 shows a flow chart illustrating a method of user pairing for MU-MIMO, in accordance with an embodiment of the present disclosure. The user pairing is performed to identify at least one user from the modified MU-MIMO group to obtain a remodified MU-MIMO group. The user pairing is initiated or starts using the pivot user. A group specific metric is obtained for the re-modified MU-MIMO group.

Figure 7A:
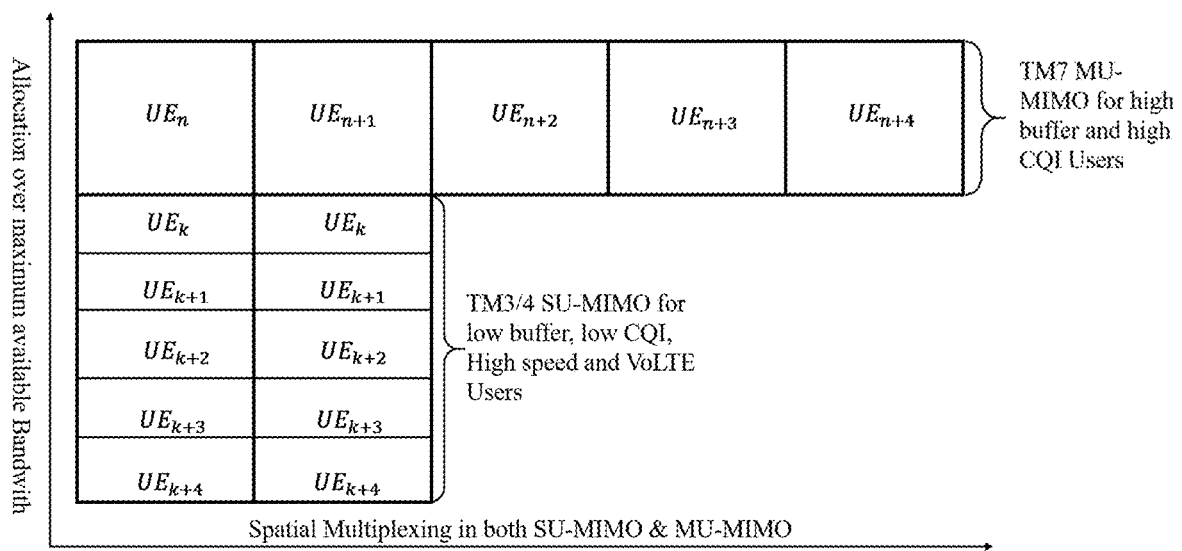
FIG. 7A shows an example illustration of resource allocation in downlink, in accordance with an embodiment of the present disclosure.

FIG. 7A shows an example illustration of resource allocation in downlink, in accordance with an embodiment of the present disclosure.

As shown in FIG. 7A, in each sub frame, PRBs are distributed among all the classified groups of users based on their associated PF metric. The users from all classified groups are multiplexed in frequency in a sub frame. For example {$UE_n$, $UE_{n+1}$, $UE_{n+2}$, $UE_{n+3}$, $UE_{n+4}$} are high buffer and high CQI users scheduled in MU-MIMO fashion i.e., users are spatially multiplexed on same time frequency resources. {$UE_k$, $UE_{k+1}$, $UE_{k+2}$, $UE_{k+3}$, $UE_{k+4}$} are one of low buffer, low CQI, high speed and VoLTE users scheduled in TM3/4 SU-MIMO and the resources are shared across frequency.

In an embodiment, the PRB Allocation is based on the PF metric. Firstly, scheduler of the BS decides MU-MIMO users and SU-MIMO users which may be scheduled in a TTI, considering PDCCH capacity. The users paired for MU-MIMO are put in one bin, bin is also referred as a group, and each SU-MIMO scheduled user put in a separate bin. After deciding users, maximum available resources i.e., maximum number of PRBs need to be distributed to all the scheduled users. The PRB allocation would be performed based on users' PF metric. The resource allocation to a user is proportional to its PF metric scaled with maximum number of PRBs. After segregating SU-MIMO users and MU-MIMO users, there are two ways to do SU/MU-MIMO multiplexing across frequency.

In an embodiment, the methods for resource allocation consider PF metric to order groups and users. Also, the methods are valid for the case of round robin scheduling as well.

In first option assuming that there is no definite sharing of SU and MU-MIMO resources. That is resources are shared between SU and MU-MIMO proportional to the associated PF metric value. The resource sharing may be performed in two ways, first for SU-MIMO users and followed by the MU-MIMO users, and other ways is first for MU-MIMO users and followed by the SU-MIMO users.

In this the first step is to calculate PF metric of users in each bin and then group specific metric is calculated as shown below $X_i = \max_j(PF(i, j))$ by considering the maximum $PF$ metric among all users in bin $i$ $X_i = \sum_j(PF(i, j))$ by summing up all the $PF$ metrics of all users in bin $i$ $X_i = \mean_j(PF(i, j))$ by averaging all the $PF$ metrics of all users in bin $i$ where j is the user index in the bin i, so that we have one PF metric for a bin. Group specific metric is collected among all users in that bin. Considering the maximum PF metric of MU-MIMO bin makes sense as MU-MIMO users have higher buffer occupancy and the resources are allocated proportional to PF metric.

Next step is to calculate the normalized PF values for all bins as follows:

$$Y_i = \frac{X_i}{\sum_i X_i} \text{ Note that } Y_i \in [0, 1]$$

Then using $Y_i$ as the PF values, the resource allocation is proportional to $Y_i$. That is, if B are the maximum available PRB s of the system, $Y_i \times B$ number of resource blocks are allocated for the users in bin i. This process continues until all the users are scheduled or allocated with the resource blocks.

In the second option, there are two scenarios for scheduling. For scheduling all users only in SU-MIMO, scheduler tries to give maximum allocation to the users in need of data. That is, firstly, scheduler prioritizes users based on PF metric and selects the pivot user. The selected pivot user is provided with full allocation over bandwidth, if that user's buffer is enough to occupy full bandwidth. If pivot user cannot occupy full bandwidth, next user in prioritized list will be scheduled and will be given remaining bandwidth if it has enough buffer to occupy all the remaining resources. This process continues until, all the resources available are allocated or until PDCCH capacity is exhausted.

For scheduling all users only in MU-MIMO, scheduler tries to select users to be multiplexed for MU-MIMO and tries to give maximum allocation. That is, scheduler orders users based on their PF metric and provides ordered list and downlink CSI as input to user pairing. User pairing outputs the set of users that can be multiplexed on same time frequency. The scheduler provides full allocation over bandwidth if one of the multiplexed users' buffer is enough to occupy full bandwidth. This second option works well for both full buffer and finite buffer scenarios.

In another embodiment, a third option is provided to have definite sharing of maximum resources between SU-MIMO users and MU-MIMO users which can be decided according to the buffer occupancy of users. For example, scheduler can decide to give 40% of resources to the MU-MIMO users and 60% resources to the SU-MIMO users. The resource allocation is performed independently for the SU-MIMO users and the MU-MIMO users proportional to their PF metric. That is resource allocation should not be proportional to Total bandwidth as described in first option, rather it should be proportional to portion of SU/MU-MIMO resources. The PF metric calculation per bin is same as provided in the first option.

Figure 7B:
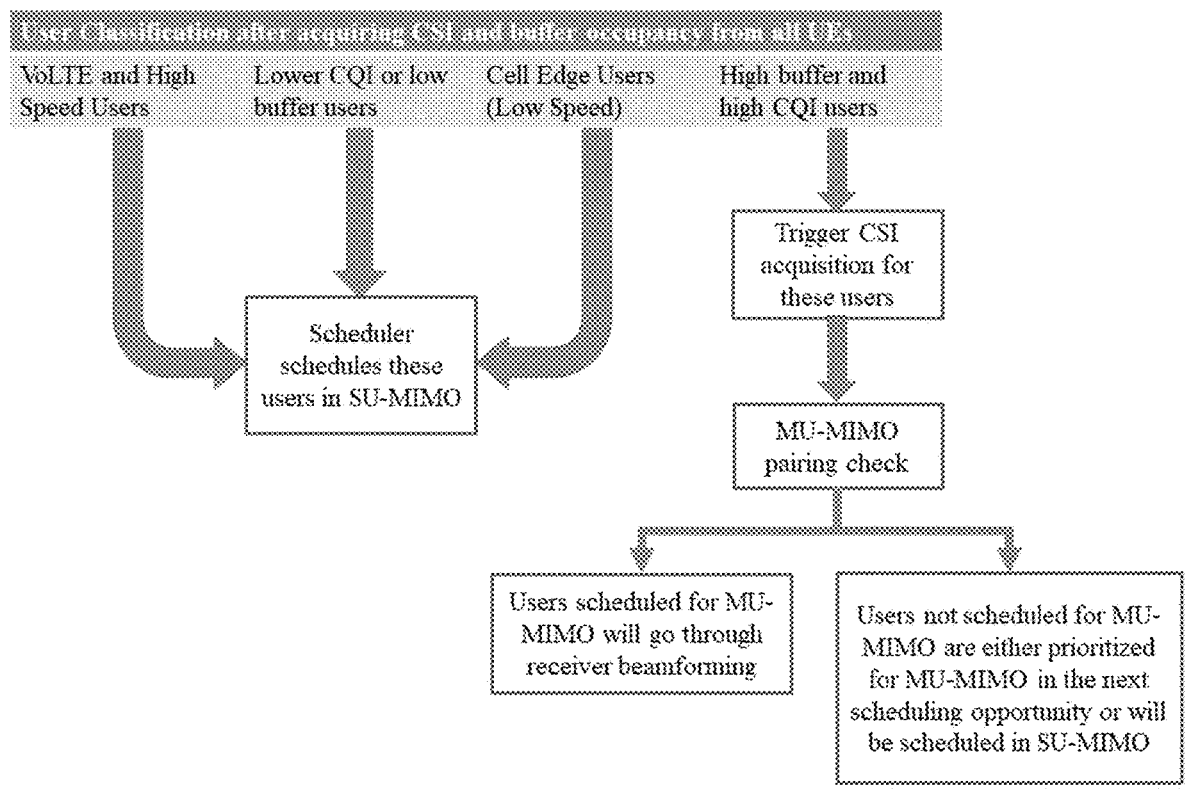
FIG. 7B shows a flowchart illustrating a method of segregation of users into single user multiple-input and multiple-output (SU-MIMO) user or multi user multiple-input and multiple-output (MU-MIMO) user based on Buffer Occupancy and CQI as part of uplink scheduling and resource allocation, in accordance with an embodiment of the present disclosure.

The methods for scheduling and resource allocation above are valid for uplink as well. As shown in FIG. 7B, user classification is done similar to downlink. As shown in FIG. 7B, VoLTE, High speed users, Lower CQI and Low buffer users, and Low speed cell edge users are scheduled in SU-MIMO. High buffer and high CQI users are preferred to be scheduled in MU-MIMO. Once the classification is done, segregation, scheduling, and resource allocation follow the methods explained above.

Figure 7C:
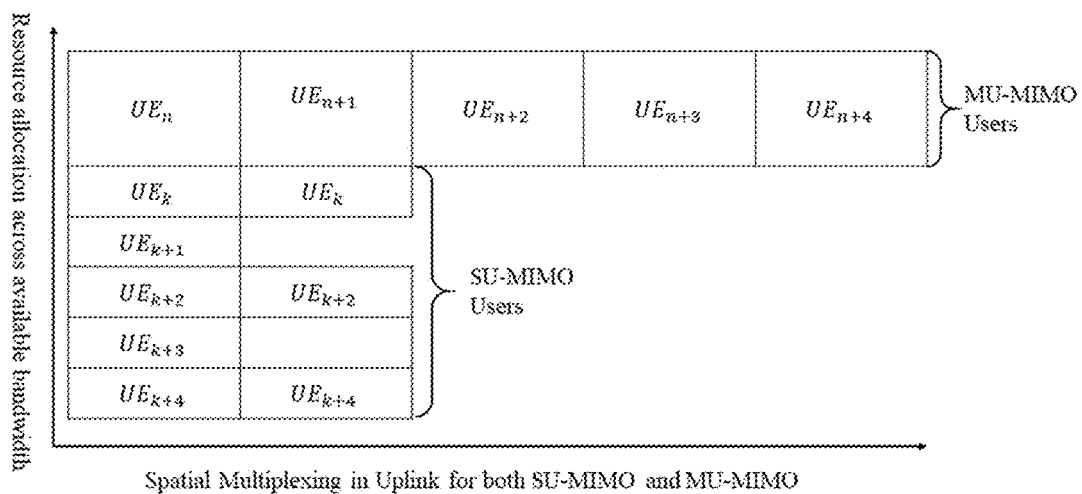
FIG. 7C shows an example illustration of resource allocation in uplink, in accordance with an embodiment of the present disclosure.

FIG. 7C shows an example illustration of resource allocation in uplink, in accordance with an embodiment of the present disclosure.

As shown in FIG. 7C, in each sub frame, PRBs are distributed among all the classified groups of users based on their associated PF metric. The users from all classified groups are multiplexed in frequency in a sub frame. For example {$UE_n$, $UE_{n+1}$, $UE_{n+2}$, $UE_{n+3}$, $UE_{n+4}$} are high buffer and high CQI users scheduled in MU-MIMO i.e., users are spatially multiplexed on same time frequency resources. {$UE_k$, $UE_{k+1}$, $UE_{k+2}$, $UE_{k+3}$, $UE_{k+4}$} are one of low buffer, low CQI, high speed and VoLTE users scheduled in SU-MIMO and the resources are shared across frequency.

In an embodiment, a PRB allocation procedure is provided for scenarios in which network load is close to full buffer. In full buffer scenario, the users are always in need of data and there is very less probability for number of PRBs allocated based on PF exceeding required number of resources for a user. However, for Non Full buffer or Finite buffer scenarios, there is high possibility to encounter the case of allocated PRBs exceeding required number of PRBs for some users in some TTIs. For this, considering $B_i$ are the number of PRBs allocated to users in bin i and B are the maximum available PRBs. Then, $B_i$ can be written as:

$$B_i = Y_i \times B$$

In Non-Full buffer scenarios, $B_i$ can be more than what users in bin i need. So after allocating resources based on the PF metric, a maximum number of resources needed for users in each bin is calculated based on users' buffer occupancy and call it as $maxAlloc_i$. So, the users or bin with $maxAlloc_i$ lesser than $B_i$ will be given $maxAlloc_i$ number of resources and remaining resources are monitored.

Let $remAlloc_i$ are remaining resources and initialized to 0. That is $remAlloc_i=0$ $remAlloc_i=remAlloc_i+ (B_i-maxAlloc_i)$ The above procedure repeats for all users which need lesser allocation than $B_i$ and remaining resources to be updated as mentioned in different options. These remaining resources need to be distributed across users for which $maxAlloc_i$ is greater than $B_i$ i.e., users needing resources more than what is allocated based on PF metric.

In an embodiment, redistributing resources among users is performed using the following, considering different possible scenarios.

For example considering a Scenario 1, in which all bins satisfying $maxAlloc_i \geq B_i$. That is, total required allocation for users from all bins greater than maximum available PRBs. In this scenario, there is no need of redistributing resources, as is $B_i$ based on PF metric are allocated to users in bin i.

For example considering Scenario 2, in which all bins satisfying $maxAlloc_i<B_i$. That is, total required allocation for users from all bins lesser than maximum available resources, then, $maxAlloc_i$ are allocated to users in bin i and $remAlloc_i$ does not has any role to play here. In this scenario, all the available resources in a TTI may not allocated.

For example considering Scenario 3, in which some bins satisfying $maxAlloc_i<B_i$ and some bins satisfying $maxAlloc_i \geq B_i$. In scenario 3, $maxAlloc_i$ rare allocated to users in bin i which satisfy $maxAlloc_i<B_i$ and in parallel, we keep track of remaining resources. And then, remaining resources $remAlloc_i$ need to distributed among bins which satisfy $maxAlloc_i \geq B_i$ taking $maxAlloc_i$ is also into consideration. In this scenario, all the available resources in a TTI may not be allocated.

Examples of the above three scenarios are provided below assuming 5 bins, also referred as groups, and maximum available PRBs of 100, and changes after redistribution are highlighted. Considering an example embodiment with a scenario 1, in which there is no need of redistributing remaining resources and scheduler ending up not allocating maximum available resources. This is shown below in Table-1:

TABLE 1

| Bin | Resources based on PF $B_i$ | Maximum allocation needed $maxAlloc_i$ | Allocated resources after redistribution | Remaining Resources $remAlloc_i$ |
|---|---|---|---|---|
| 1 | 23 | 18 | 18 | 5 |
| 2 | 27 | 22 | 22 | 10 |
| 3 | 15 | 13 | 13 | 12 |
| 4 | 8 | 5 | 5 | 15 |
| 5 | 27 | 23 | 23 | 19 |

Total Resources allocated: 81/100

In another example for Scenario 2, there is no need of redistributing remaining resources and scheduler allocating maximum available resources. This is shown below in Table-2:

TABLE 2

| Bin | Resources based on PF $B_i$ | Maximum allocation needed $maxAlloc_i$ | Allocated resources after redistribution | Remaining resources $remAlloc_i$ |
|---|---|---|---|---|
| 1 | 23 | 100 | 23 | 0 |
| 2 | 27 | 80 | 27 | 0 |
| 3 | 15 | 100 | 15 | 0 |
| 4 | 8 | 9 | 8 | 0 |
| 5 | 27 | 76 | 27 | 0 |

Total Resources allocated: 100/100

In another example embodiment for a Scenario 3, an equal distribution of remaining resources for users which are in need of more resources than $B_i$. This is shown in below Table-3:

TABLE 3

| Bin | Resources based on PF ($B_i$) | Maximum allocation needed ($maxAlloc_i$) | Allocated resources after redistribution | Remaining resources $remAlloc_i$ |
|---|---|---|---|---|
| 1 | 23 | 18 | 18 | 5 |
| 2 | 27 | 22 | 22 | 10 |
| 3 | 15 | 13 | 13 | 12 |
| 4 | 8 | 100 | 14 | 6 |
| 5 | 27 | 76 | 33 | 0 |

Total Resources allocated: 100/100

In an example embodiment for scenario 3, an unequal distribution of remaining resources for users which are in need of more resources than $B_i$ and allocating maximum available resources. This is shown in below Table-4.

TABLE 4

| Bin | Resources based on PF ($B_i$) | Maximum allocation needed ($maxAlloc_i$) | Allocated resources after redistribution | Remaining resources $remAlloc_i$ |
|---|---|---|---|---|
| 1 | 23 | 18 | 18 | 5 |
| 2 | 27 | 22 | 22 | 10 |
| 3 | 15 | 13 | 13 | 12 |
| 4 | 8 | 12 | 12 | 8 |
| 5 | 27 | 76 | 35 | 0 |

Total Resources allocated: 100/100

In another example embodiment for a scenario 3, in which an unequal distribution of remaining resources for users which are in need of more resources than $B_i$ and ending up not allocating maximum available resources. This is shown in the below Table-5 i.e. the unequal distribution of remaining resources:

TABLE 5

| Bin | Resources based on PF ($B_j$) | Maximum allocation needed (maxAlloc$_i$) | Allocated resources after redistribution | Remaining resources remAlloc$_i$ |
|---|---|---|---|---|
| 1 | 23 | 18 | 18 | 5 |
| 2 | 27 | 22 | 22 | 10 |
| 3 | 15 | 13 | 13 | 12 |
| 4 | 8 | 8 | 8 | 12 |
| 5 | 27 | 32 | 32 | 7 |

Total Resources allocated: 95/100

Figure 8:
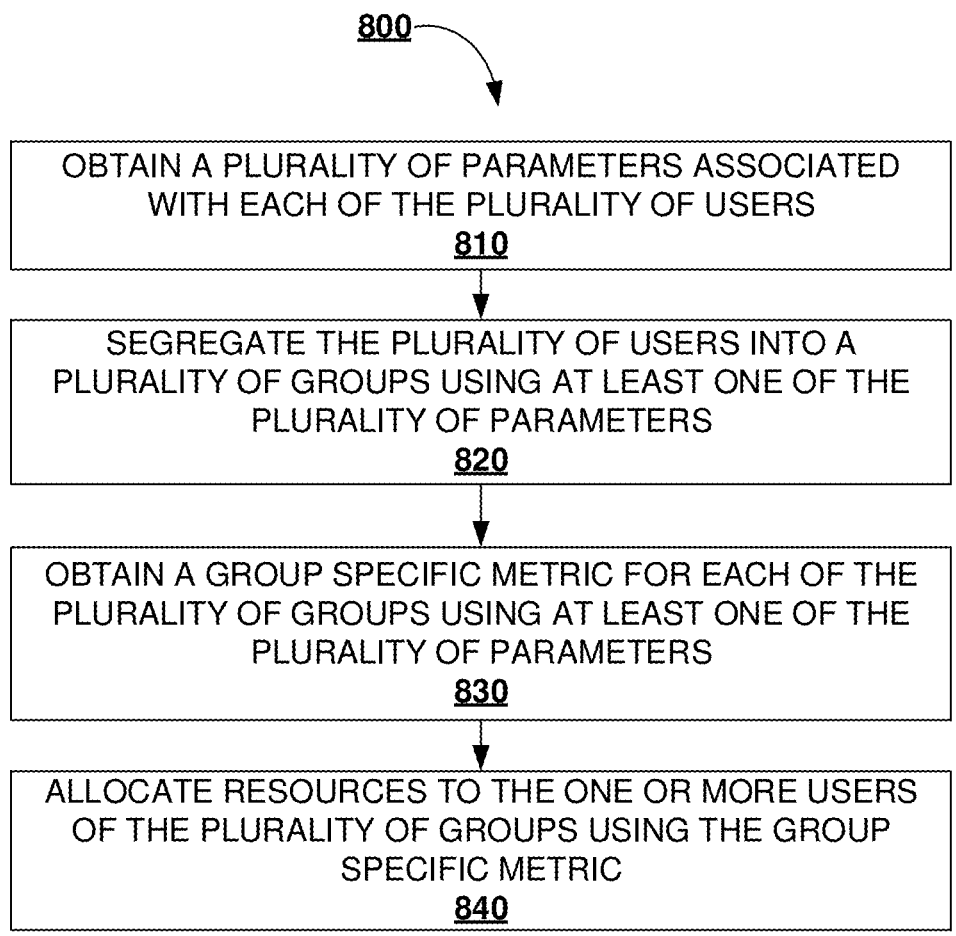
FIG. 8 shows a flowchart illustrating a method for allocating resources to a plurality of users by a base station (BS) in a communication network, in accordance with an embodiment of the present disclosure.

FIG. 8 shows a flowchart illustrating a method for allocating resources to a plurality of users by a base station (BS) in a communication network, in accordance with an embodiment of the present disclosure.

As illustrated in FIG. 8, the method 800 comprises one or more blocks for method of allocating resources to a plurality of users by a base station (BS) in a communication network. The order in which the method 800 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 810, obtaining a plurality of parameters associated with each of the plurality of users by the base station. The plurality of parameters is at least one of buffer occupancy, channel quality, channel state information (CSI) acquisition capability and the like.

At block 820, segregating the plurality of users into a plurality of groups using at least one of the plurality of parameters, wherein each of the plurality of groups comprises one or more users. Each of the plurality of groups is one of a SU-MIMO group and a MU-MIMO group. The SU-MIMO group comprises a single SU-MIMO user. The MU-MIMO group comprises one or more MU-MIMO users.

At block 830, obtaining a group specific metric for each of the plurality of groups using at least one of the plurality of parameters associated with the one or more users associated with each of the plurality of groups. The group specific metric of each of the plurality of groups is obtained using a first metric of the one or more users associated with each of the plurality of groups. The first metric is one of a proportional fair metric and number of scheduled opportunities.

The one or more users in the MU-MIMO group are ordered based on a first metric, to obtain a modified MU-MIMO group. Also, a pivot user is identified for the modified MU-MIMO group, wherein the pivot user is a user with highest first metric value within the modified MU-MIMO group. A user pairing is performed to identify at least one user from the modified MU-MIMO group to obtain a remodified MU-MIMO group, the user pairing starts with the pivot user. A group specific metric is obtained for the re-modified MU-MIMO group.

At block 840, allocating resources to the one or more users of the plurality of groups using the group specific metric. The allocation of resources to the plurality of SU-MIMO groups and re-modified MU-MIMO group is for performed by ordering the plurality of SU-MIMO groups according to a SU-MIMO group metric, to obtain an ordered plurality of SU-MIMO groups. The SU-MIMO group metric is a group specific metric of a SU-MIMO group. Thereafter, a subset of the ordered plurality of SU-MIMO groups and a subset of users from the re-modified MU-MIMO group are selected according to a second metric. The selected subset comprises one or more scheduled users for allocating resources. The second metric is one of a control channel capacity and a buffer occupancy.

In an embodiment, the allocating resources to the one or more scheduled users comprises pre-determined resource sharing, also referred as fixed resource sharing, between the one or more scheduled users that are SU-MIMO users and the one or more scheduled users that are MU-MIMO users. This allocating resources is performed using one of the MU-MIMO group metric, the SU-MIMO group metric and the first metric. In an embodiment, the allocated resources are redistributed among the scheduled one or more users according to the buffer occupancy.

Also, in another embodiment, the allocating resources to the one or more scheduled users is performed according to the buffer occupancy, wherein one of the scheduled users is allowed to occupy all the resources according to the buffer occupancy. When the resources are not completely allocated then one of the scheduled users is allowed to occupy the remaining resources.

Thereafter, in case of downlink, transmitting data and reference signals associated with each of the plurality of UE's associated with the selected group, by a plurality of antennas (not shown in figures) configured in the BS 200, using the corresponding precoding weights on a sub-set of pool of resources. The sub-set of resources are allocated to a sub-set of plurality of groups based on the first metric. In case of uplink, data and reference signals are received at BS using receiver beamforming.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

We claim:

1. A method for allocating resources to a plurality of users by a base station (BS) in a communication network, the method comprising:
   obtaining, by the BS, a plurality of parameters associated with each of the plurality of users, said plurality of parameters comprising a buffer occupancy and an acquisition capability;
   segregating, by the BS, the plurality of users into a plurality of groups using at least one of the plurality of parameters, wherein each of the plurality of groups comprises one or more users of the plurality of users;
   obtaining, by the BS, a group specific metric for each of the plurality of groups using at least one of the plurality of parameters associated with the one or more users associated with each of the plurality of groups; and
   allocating resources, by the BS, to the one or more users of the plurality of groups according to the group specific metric.

2. The method as claimed in claim 1, wherein each of the plurality of groups is one of a SU-MIMO group and a MU-MIMO group, wherein the SU-MIMO group comprises a SU-MIMO user, wherein the MU-MIMO group comprises one or more MU-MIMO users.

3. The method as claimed in claim 1, wherein the group specific metric for each of the plurality of groups is obtained using a first metric of the one or more users associated with each of the plurality of groups, wherein the first metric is one of a proportional fair metric and number of scheduled opportunities.

4. The method as claimed in claim 2, wherein the one or more users in the MU-MIMO group are ordered based on a first metric to obtain a modified MU-MIMO group.

5. The method as claimed in claim 4, wherein a pivot user is identified for the modified MU-MIMO group, said pivot user is a user with a highest first metric value within the modified MU-MIMO group.

6. The method as claimed in claim 5, wherein the method comprises user pairing to identify at least one user from the modified MU-MIMO group to obtain a remodified MU-MIMO group, said user pairing starts with the pivot user.

7. The method as claimed in claim 6, wherein a MU-MIMO group metric is obtained for the re-modified MU-MIMO group.

8. The method as claimed in claim 7, wherein the method comprises allocating resources to the plurality of SU-MIMO groups and re-modified MU-MIMO group by:
   ordering the plurality of SU-MIMO groups according to a SU-MIMO group metric to obtain an ordered plurality of SU-MIMO groups; and
   selecting a subset of the ordered plurality of SU-MIMO groups and a subset of users of the re-modified MU-MIMO group according to a second metric, wherein the selected subsets comprise one or more scheduled users for allocating resources.

9. The method as claimed in claim 8, wherein the second metric is one of a control channel capacity and a buffer occupancy.

10. The method as claimed in claim 8, wherein the method comprises allocating resources to the one or more scheduled users by pre-determined resource sharing between the one or more scheduled users that are SU-MIMO users and the one or more scheduled users that are MU-MIMO users.

11. The method as claimed in claim 8, wherein the method comprises allocating resources to the one or more scheduled users according to one of the MU-MIMO group metric, SU-MIMO group metric and the first metric.

12. The method as claimed in claim 11, wherein the allocated resources are redistributed among the scheduled one or more users according to the buffer occupancy.

13. The method as claimed in claim 8, wherein the method comprises allocating resources to the one or more scheduled users according to the buffer occupancy.

14. The method as claimed in claim 13, wherein one of the scheduled users is allowed to occupy all the resources according to the buffer occupancy.

15. The method as claimed in claim 13, wherein one of the scheduled users is allowed to occupy the remaining resources when the resources are not completely allocated.

16. A base station (BS), wherein:
   the BS is configured to:
   obtain a plurality of parameters associated with each of a plurality of users, wherein the plurality of parameters comprises a buffer occupancy and an acquisition capability;
   segregate the plurality of users into a plurality of groups according to at least one of the plurality of parameters, wherein each of the plurality of groups comprises one or more users of the plurality of users;

obtaining a group specific metric for each of the plurality of groups according to at least one of the plurality of parameters; and allocate resources to the one or more users of a group of the plurality of groups according to the group specific metric obtained for the group.

17. The BS as claimed in claim 16, wherein:
the group specific metric for each of the plurality of groups is obtained using a first metric of the one or more users associated with each of the plurality of groups, and
the first metric is one of a proportional fair metric and a number of scheduled opportunities.

18. The BS as claimed in claim 16, wherein:
each of the plurality of groups is one of a SU-MIMO group and a MU-MIMO group,
the SU-MIMO group comprises a SU-MIMO user,
the MU-MIMO group comprises one or more MU-MIMO users, and
the one or more users in the MU-MIMO group are ordered according to a first metric to obtain a modified MU-MIMO group.

19. The BS as claimed in claim 18, wherein:
a pivot user is identified for the modified MU-MIMO group,
the pivot user, of the modified MU-MIMO group, is a user with a highest first metric value,
the BS is configured to identify at least one user from the modified MU-MIMO group, via user pairing, to obtain a remodified MU-MIMO group, and
the user pairing starts with the pivot user.

20. The BS as claimed in claim 19, wherein the BS is configured to allocate resources to the plurality of SU-MIMO groups and the re-modified MU-MIMO group by:
ordering the plurality of SU-MIMO groups according to a SU-MIMO group metric; and
selecting a subset of the ordered plurality of SU-MIMO groups and a subset of users of the re-modified MU-MIMO group according to a second metric, wherein:
the selected subsets comprise one or more scheduled users for allocating resources, and
the BS is configured to allocate resources to the one or more scheduled users according to the buffer occupancy.

* * * * *